Sept. 11, 1962  B. W. CARTWRIGHT ETAL  3,053,115
HYDRODYNAMIC TRANSMISSION
Filed Jan. 19, 1959  3 Sheets-Sheet 1
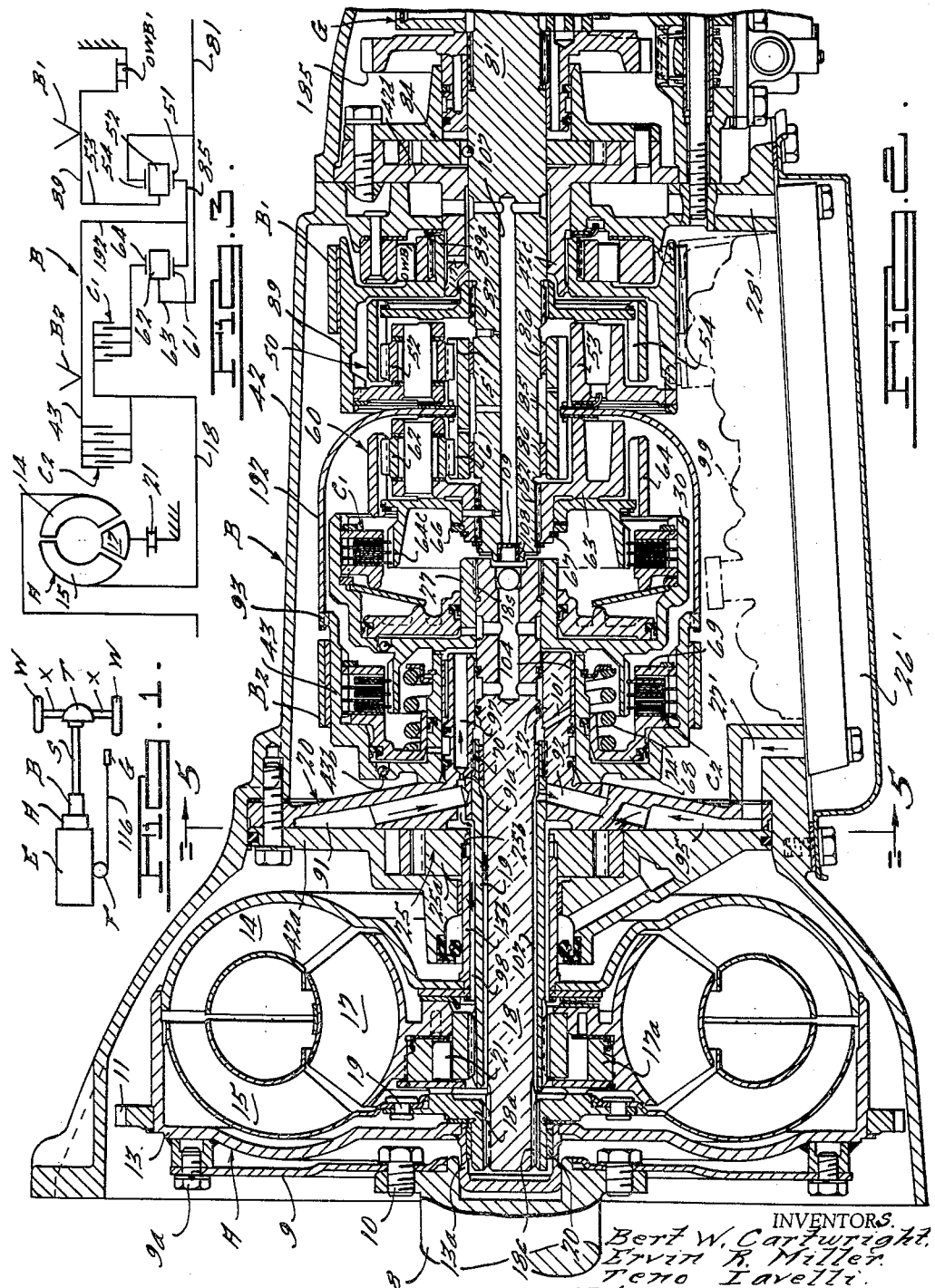
INVENTORS.
Bert W. Cartwright,
Ervin R. Miller,
Teno Iavelli.
BY Harness and Harris
ATTORNEYS.

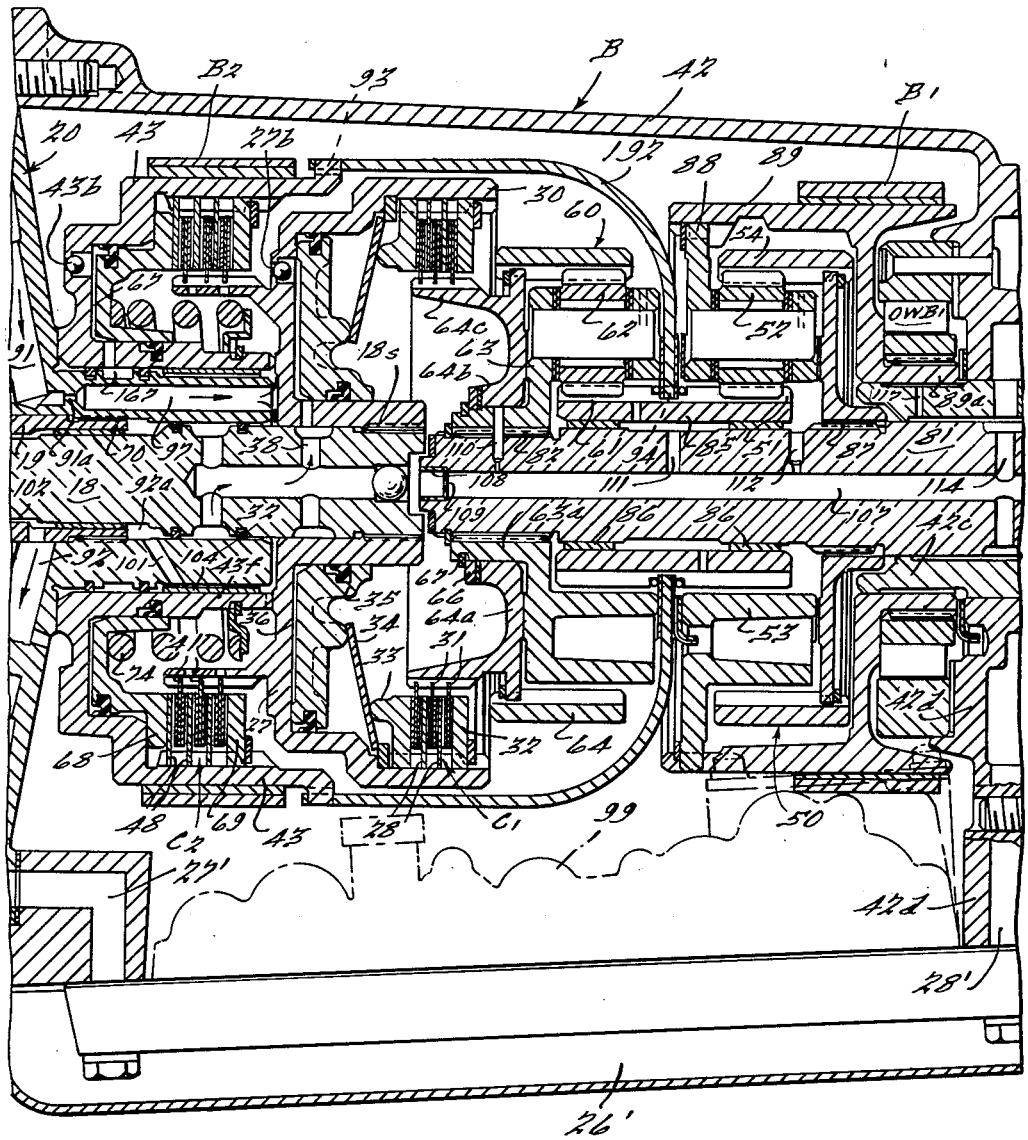

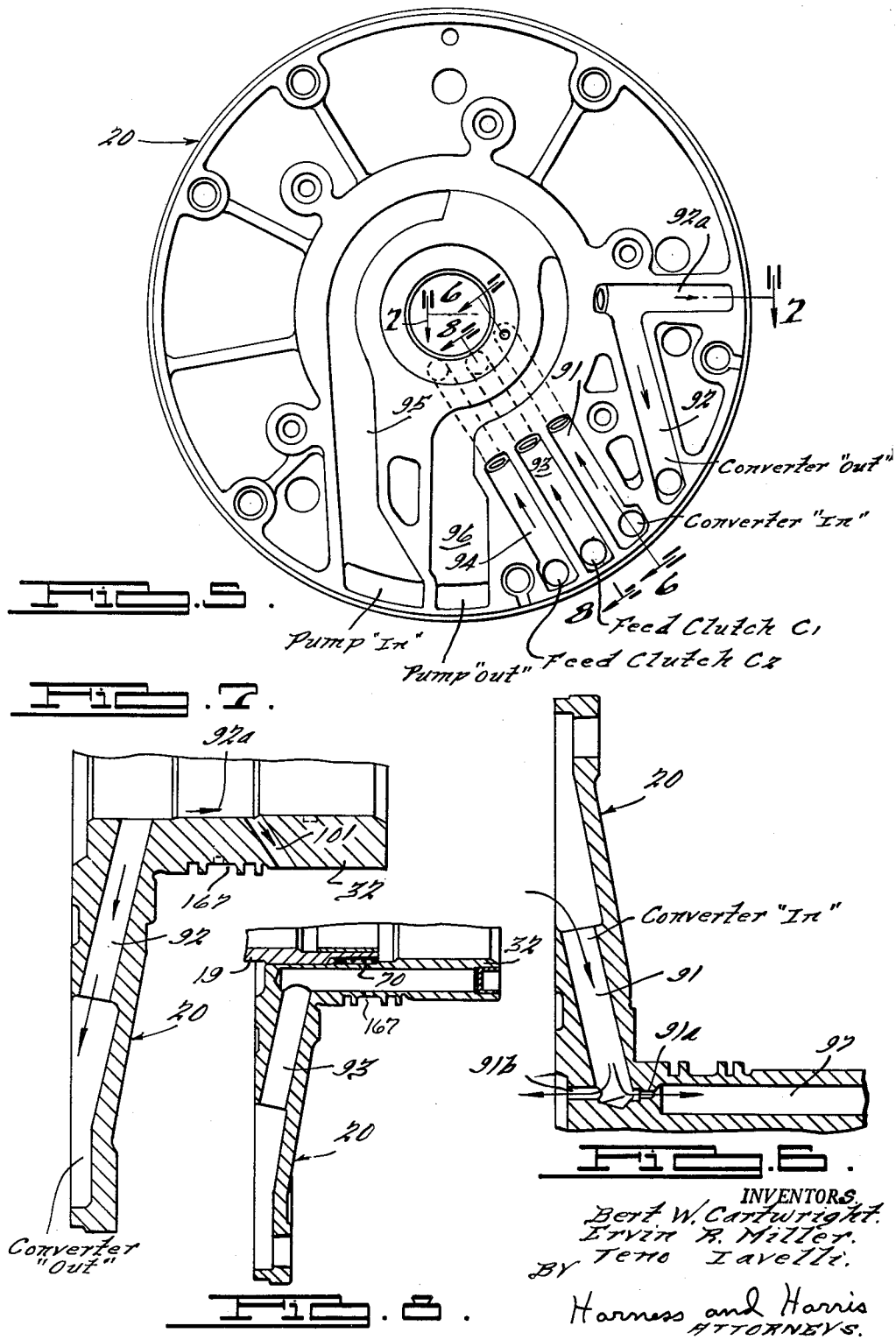

United States Patent Office 3,053,115
Patented Sept. 11, 1962

3,053,115
HYDRODYNAMIC TRANSMISSION
Bert W. Cartwright, East Detroit, and Ervin R. Miller and Teno Iavelli, Detroit, Mich., assignors to Chrysler Corporation, Highland Park, Mich., a corporation of Delaware
Filed Jan. 19, 1959, Ser. No. 787,556
6 Claims. (Cl. 74—730)

This invention relates to a power transmission unit primarily intended for motor vehicle use and is particularly concerned with a transmission having a novel arrangement of parts that facilitates assembly, provides improved lubrication of the elements, and permits variation in manufacturing tolerances without causing noise, wear or operational problems in the gear box. This transmission will function to automatically provide for three (3) different forward drive speeds and also a reverse drive. This invention is an improvement on the design shown in H. W. Simpson U.S. Patent 2,856,794.

It is a primary object of this invention to provide a three forward speeds and reverse drive motor vehicle transmission that utilizes the minimum number and the least complicated transmission elements with said elements arranged in a novel manner such that the gearing elements are self-contained on the gear box output shaft and the several friction clutch elements are self-contained on the gear box input shaft and portions of the gear box housing adjacent the bearing support for the gear box input shaft.

It is another object of this invention to provide a simplified three forward speeds and reverse drive transmission adapted for automatic and/or manual control that utilizes a pair of simple planetary gear sets in combination with a one-way brake and a pair of friction clutches and an hydraulic torque converter wherein lubrication of certain of the clutch elements is supplied by the fluid feed system for the torque converter.

It is still another object of this invention to provide a power transmission unit of the aforementioned type wherein the gearing and the clutching elements of the gear box are associated with the torque converter and the transmission lubrication system in a new and improved manner.

It is still another object of this invention to arrange the elements of the planetary gear trains on the gear box output shaft such that bearing and thrust loads will be reduced to a minimum and isolated from the clutch elements mounted on the gear box input shaft.

It is still another object of this invention to arrange the gearing of the gear box output shaft as a self-contained unit such that gear thrust loads are isolated on the output shaft and not transferred to the gear box case thereby eliminating gear thrust washers and permitting use of a less expensive gear box construction.

Other objects and advantages of this invention will become readily apparent from a consideration of the subsequent description and the related drawings wherein;

FIG. 1 is a schematic view of a motor vehicle drive train that includes a power transmission unit embodying this invention;

FIG. 2 is a sectional elevational view of the power transmission unit utilized in the disclosed drive train of FIG. 1;

FIG. 3 is a schematic line diagram of the power transmission unit shown in FIG. 2;

FIG. 4 is an enlarged, fragmentary, sectional elevational view of the gear box of the power transmission unit;

FIG. 5 is an enlarged, elevational view of the converter reaction shaft support plate that serves as an oil gallery for the gear box shown in FIG. 2, the view being taken as indicated by the arrows 5—5 of FIG. 2;

FIG. 6 is an enlarged, fragmentary, sectional elevational view of a portion of the support plate shown in FIG. 5, the view being taken as indicated by the arrows 6—6 of FIG. 5;

FIG. 7 is another fragmentary, sectional elevational view, similar to FIG. 6, the view being taken as indicated by the arrows 7—7 of FIG. 5; and FIG. 8 is another fragmentary, sectional elevational view, similar to FIG. 6, the view being taken as indicated by the arrows 8—8 of FIG. 5.

FIG. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear driving wheels W of the vehicle.

FIG. 2 of the drawings discloses the power transmission unit structure that consists of a torque converter device A and the change speed gear box B that are arranged in a series connected drive transmitting relationship. The reference numeral 8 represents an end portion of a driving member, such as the crankshaft of the engine E of the motor vehicle power plant. The shaft 8 is drivingly connected to the drive transmitting ring 9 by the screw means 10. The drive transmitting ring 9 is drivingly connected by bolts 9a to the torque converter casing 13. The converter casing 13 has an engine starter ring gear 11 mounted on and extending about its periphery. Within the torque converter casing 13 are mounted the several vaned converter wheel elements, namely, the impeller or pump member 14, the turbine or runner member 15, and the guide or reaction member 17. A pair of guide wheels may be used in place of the single guide wheel 17 if desired.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion formed on the shaft hub member 18a of shaft 18. Shaft hub member 18a is drivingly connected by splines 18c to the forward end portion of the torque converter driven shaft member 18.

The converter driven shaft member 18 is adapted to transmit drive from the turbine member 15 of the torque converter device A to the planetary gearing of the gear box unit B that is arranged rearwardly of and in series with the torque converter device A. The converter driven shaft 18 thus provides the input shaft to the gear box B. The forward end of shaft 18 is journalled in a bearing 20 that is piloted in an axially extending seat 13a formed in the hub of the torque converterd casing 13. The rear end portion of converter driven shaft 18 is rotatably supported by the sleeve 32 of the converter reaction shaft support plate 20 that is carried by the front wall 42a of the gear box housing 42.

The vaned converter guide wheel 17 is rotatably mounted within the converter casing 13 by means of the guide wheel hub portion 17a. Guide wheel hub portion 17a is supported by means of the one-way brake device 21, on the axially extending hollow sleeve 19 that is splined to the sleeve 32 of support plate 20 at the connection 70. The one-way brake 21 (see FIG. 2) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The one-way brake 21 herein disclosed may be any form of roller, sprag or similar type device.

The torque converter unit A includes a gear type oil pump 25 having a driving gear 25a that is directly connected by key means 25b to the rearwardly projecting end of an axially extending, sleeve-like, flange portion 13b of the rotatable converter casing 13. The pump 25 draws oil from a supply sump 26' through supply conduit 27' and circulates this oil through the converter A, the transmission unit lubricating system and the various hydraulically operated control mechanisms (not shown) associated with this power transmission unit. A second pump 84, driven by the transmission output shaft 81, is also included in this transmission unit. The second pump 84 provides a second source of pressure fluid for operation of the various aforementioned hydraulically operated devices and insures a pressure fluid supply even at times when the engine driven pump 25 might not be operating. Pump 84 will thus provide pressurized fluid during pushed or towed starting as well as during engine driven operation of the vehicle. Pump 84 is connected to the oil supply sump 26' by the conduit 28'.

The gear box B includes the forward drive clutch $C_1$, the direct drive clutch $C_2$, and the pair of planetary gear trains 50 and 60 that are adapted to cooperate with the torque converter device A to provide means for the transmission of three forward drives and a reverse drive to the propeller shaft S. The forward drive clutch $C_1$ is engaged whenever any of the three forward speeds is being utilized and it is disengaged when the transmission controls are set for either Neutral or Reverse. The direct drive clutch $C_2$ is engaged only when the 3rd or Direct forward speed is being transmitted or when Reverse drive is being transmitted. The different clutches and brakes that are applied for transmitting the several drive ratios obtainable with this transmission are set forth in the chart below:

| Drive ratio: | Members applied |
| --- | --- |
| Low (1st) | $C_1$ and $B_1$ or $O.W.B._1$. |
| Kickdown (2nd) | $C_1$ and $B_2$. |
| Direct (3rd) | $C_1$ and $C_2$. |
| Reverse | $C_2$ and $B_1$. |

The gear box B includes the housing 42 which may be considered to include front and rear portions. In the front portion of the housing 42 are located the clutches $C_1$ and $C_2$ whereas the rear portion houses the two planetary gears 50 and 60. The rear end of the converter driven gear box input shaft 18 may or may not pilot the forward end of the gear box output shaft 81 although such a connection is not shown in the disclosed form of this invention. Output shaft 81 has its rear end portion journaled in the sleeve portion 42c of the transmission housing rear wall 42d. Transmission input shaft 18 is drivingly connected at 18s to a spider element 27. The spider element 27 carries the friction clutch disc elements 41 of the reverse and direct drive clutch $C_2$. Clutch discs 41 are adapted to be drivingly engaged with the clutch discs 48 that are drivingly connected to the interior surfaces of the brake drum 43. Brake drum 43 is journaled on the rearwardly projecting sleeve-like hub 32 of the support plate 20 that is bolted to the gear box housing front wall 42a. A brake band $B_2$ is arranged to be selectively applied to the brake drum 43 to prevent rotation thereof. Brake drum 43 mounts a backing plate 69 that cooperates with an axially shiftable piston 68 to effect drive transmitting engagement of the clutch discs 41, 48. Spring 74 normally urges the piston 68 forwardly to clutch disengaged position. Brake drum 43 may include a ball check pressure fluid bleed valve 43b that is speed responsive and arranged to prevent unintended engagement of the clutch $C_2$ by the centrifugal action of any fluid that may be trapped in the piston bore 67. Pressure fluid for operation of the clutch $C_2$ is supplied to the piston bore 67 through the conduit 167 that is connected to a suitable fluid pressure control valve not shown.

Also drivingly mounted on the spider 27, and extending rearwardly therefrom, is a clutch drum 30. Clutch drum 30 has drivingly and shiftably mounted on its interior face the friction clutch discs 28. Clutch discs 28 are arranged to be drivingly engaged with the clutch disks 31 that are carried by an axially extending projection 64c of the annular gear 64 of the forwardly arranged planetary gear set 60. Clutch discs 28 and 31 are arranged to be drivingly compressed against the backing plate 32 by the pressure plate 33 that is actuated by the lever spring plate 34. Lever spring plate 34 is operated by the piston 35 that reciprocates in a cylinder bore 36 formed in the rear side of the spider 27. Pressure fluid is supplied to the cylinder bore 36 by way of the conduit 38 that is connected to a pressure fluid control valve not shown. The spider 27 may mount a pressure fluid ball check bleed valve 27b that will prevent unintended engagement of the clutch $C_1$ by centrifugal force action on any fluid that might be trapped in the cylinder bore 36.

Arranged axially adjacent the forward drive clutch $C_1$ is the forwardly located planetary gear set 60. This gear set 60 comprises the annulus gear 64, the sun gear 61, the planet pinion gearing 62 connecting gears 61, 64, and the planet pinion gear carrier 63 that rotatably supports the pinion gearing. Pinion gearing carrier 63 is splined to the output shaft 81 at 82. Annulus gear 64 is supported through its radially extending plate portion 64a on the hub 63a of the planet pinion gear carrier 63. The forward end of the hub portion 64b of the annulus gear 64 can react against the rear end of the bearing ring 66 that is anchored to the pinion gear carrier hub 63a by the snap ring 67. This connection 67 prevents the transmission of thrust forces from gearing 50 to the input shaft 18 or to the clutches $C_1$ and $C_2$. The sun gear 61 is an integral part of the double sun gear sleeve 85. Sleeve 85 has the sun gear 61 formed on the front end thereof and the sun gear 51 of planetary gear set 50 is formed on the rear end thereof. Sun gear sleeve 85 is journaled on the output shaft 81 by means of sleeve bearings 86.

The rearwardly located gear set 50 includes the sun gear 51, the annulus gear 54, the planet pinion gearing 52 that connects the gears 51, 54, and the planet pinion gear carrier 53 that rotatably supports the pinion gearing 52. Annulus gear 54 is drivingly connected to the output shaft 81 by the splines 87. The spline connection 87 prevents the transmission of rearwardly directed, axial thrust forces from gearing 50 to the housing rear wall collar 42c. Pinion gear carrier 53 is drivingly connected at 88 to a brake drum 89 that is adapted to be engaged by the brake band $B_1$. Brake drum 89 has a hub portion 89a that is journaled on the forwardly projecting collar 42c of the rear wall 42d of the transmission housing 42. Hub portion 89a of the brake drum 89 is restrained against reverse rotation, counterclockwise when looking from the front towards the rear of the transmission, by means of the one-way brake device $O.W.B._1$ which may be a roller, sprag, or similar type of one-way device.

Interconnection between the two axially spaced adjacent gear sets 50, 60 is by way of the common sun gear sleeve 85 and by way of the dual connections of the front carrier 63 and the rear annulus gear 54 to the common output shaft 81.

A drum connector 192 is connected between the front brake drum 43 and the sun gear sleeve 85. Connector drum 192 is splined to the drum 43 at 93 and to the sun gear sleeve 85 at 94. Drum connector 192 is the means whereby the integral sun gears 51, 61 can be anchored against rotation when brake band $B_2$ is applied to brake drum 43.

Mounted on the rear end of the output shaft 81 is rear oil pump 84 and a sprag gear 185 that is adapted to be engaged by a parking sprag not shown. Also mounted on the rear end of the output shaft 81 is the hydraulic governor device G that is a part of the transmission control system. This governor device may be of the type shown in U.S. Patent 2,697,363 to W. L. Sheppard.

It is thought to be obvious that the valve body 99 that includes the several fluid control mechanisms for this automatic type of three forward speeds and reverse drive transmission will be mounted in the transmission housing oil sump 26'. This location makes it easy to adjust, repair, or replace the valve body 99 and it also permits foreshortening of the transmission length.

With the aforedescribed gear box, when the transmission is set in Neutral, the hydraulic control system (not shown) prevents the application of pressurized fluid to either of the clutches $C_1$ or $C_2$ or to either of the servos (not shown) that are used to apply the braking bands $B_1$ and $B_2$. When clutch $C_2$ is disengaged, the torque converter-driven, gear box input shaft 18 is disconnected from the gear box gear set 60 so there can be no drive input to either of the gear sets 50, 60 through the sun gears 51, 61 of the gear sets.

When the drive ratio selector elements (not shown) are set for the initiation of drive in the Drive ratio, the forward drive clutch $C_1$ is automatically engaged and this transmits drive to the gear box planetary input gear 64. Neither of the braking bands $B_1$ or $B_2$ nor the clutch $C_2$ is engaged at this time. The one-way brake $O.W.B._1$ prevents reverse rotation of the carrier 53 at this time and this one-way brake device provides the reaction for the compounded gear sets 50 and 60 which cooperate to transmit the one-way Low or first speed forward drive to the gear box output shaft 81. This Low speed drive passes from the input shaft 18 through the engaged clutch $C_1$ and then to the ring gear 64. Ring gear 64 acts on the planet pinion gears 62 and causes rotation of the sun gear 61 backwards because the load on the output shaft 81 tends to anchor the planet pinion carrier 63 against rotation. Rotation of sun gear 61 backwards rotates the sun gear sleeve 85 and the other sun gear 51 backwards. The sun gear 51 rotating backwards acts on the planet pinions 52 and tends to rotate the pinion gear carrier 53 backwards because of the output shaft load on the ring gear 54. Due to the one-way brake device $O.W.B._1$ the carrier 53 can not be rotated backwards and the pinion gears 52 are then active to drive the ring gear 54 and connected output shaft 81 forwardly. Due to the connection of both the carrier 63 and the ring gear 54 to the output shaft 81 and due to the anchoring of carrier 53 by brake $O.W.B._1$ at this time, part of the torque of the input shaft 18 is transmitted directly to the output shaft 81 by the planetary gear set 60 and the other part of the input shaft torque is delivered to the output shaft 81 through the compounded gear sets 50 and 60. The starting Low drive when the transmission is set for Drive, or any other forward drive ratio for that matter, thus passes through both of the gear sets 50 and 60 with the reaction normally provided by the one-way brake device $O.W.B._1$.

When Second speed is to be attained by an upshift from the starting Low, it is merely necessary to apply braking band $B_2$ while the forward drive clutch $C_1$ remains engaged. This anchors the rotatable sleeve 85 that carries the sun gears 51 and 61. With sun gear 61 anchored the planetary gear set 60 is activated to directly transmit a two-way forward Second speed drive from ring gear 64 to pinions 62 to the output shaft 81 by way of the carrier 63. Planetary gear set 50 is inactive at this time and its pinion gear carrier 53 is driven forwardly at a speed which causes it to lift off and to overrun the one-way brake device $O.W.B._1$. Braking band $B_1$ and clutch $C_2$ remain disengaged when the transmission is conditioned for Second speed forward drive. It will be noted that no braking band need be released on the normal upshift from Low to Second because the Second speed can lift off the one-way brake $O.W.B._1$ when band $B_2$ is applied to activate Second speed. Likewise, no braking band need be applied on an automatic downshift from Second to Low because the drive can drop down on to the one-way brake device $O.W.B._1$ as the band $B_2$ is released.

Third forward speed or direct drive is achieved by an upshift from Second that results from the engagement of the direct drive clutch $C_2$ at the time there is a release of band $B_2$. The forward drive clutch $C_1$ remains engaged when in Third forward speed while bands $B_1$ and $B_2$ are each released. Engagement of clutch $C_2$ while clutch $C_1$ is engaged connects the ring gear 64 and the sun gear 61 of the planetary gear set 60 and this locks up the gear set 60 for the transmission of a direct 1:1 forward drive. Locking up gear set 60 also locks up gear set 50 because of the interconnection between the several elements of these two gear sets.

Reverse drive is obtained by engaging the clutch $C_2$ and applying the brake band B while the clutch $C_1$ is disengaged and the braking band $B_2$ is released. With clutch $C_1$ disengaged there is no drive input to the ring gear 64. Drive input is from the input shaft 18 through the clutch $C_2$ and drum 92 to the sun gear 51. As braking band $B_1$ is applied the carrier 53 is anchored and the output shaft mounted ring gear 54 is driven in a backwards or reverse direction by the gear set 50. Planetary 50 is thus effective to transmit the Reverse drive.

For a coasting low speed ratio, for use as a brake or for continuous low speed operation, the braking band $B_1$ can be applied at the same time that the one-way brake $O.W.B._1$ and the forward drive clutch $C_1$ are engaged. The one-way brake $O.W.B._1$ cannot be relied on for a coast brake in Low speed because it would permit carrier 53 to overrun at certain vehicle speeds.

For a coasting Second speed ratio, for use as a coast brake, or for limiting the transmission to an automatic two-speed operation, or for effecting a downshift to Second speed drive from the Third speed or direct drive, the transmission control (not shown) that activates Second speed can be operated.

The control system for this transmission may include a manually operable drive ratio selector means such as that shown in the co-pending application of H. E. Scharfenberg Serial No. 596,529, filed July 9, 1956, now Patent No. 2,989,958. The remainder of the control system may be of the hydraulic type shown in the co-pending application of Leonard E. Froslie Serial No. 640,804 filed February 18, 1957, now Patent No. 3,000,230.

From a study of FIG. 4, it will be noted that the gear box B includes two so-called "self-contained" units, namely, a first unit including the clutch elements $C_1$ and $C_2$, that are mounted on the gear box input shaft 18, and a second unit including the gear trains 50, 60 that are mounted on the output shaft 81. With this type of arrangement misalignment between the input and output shafts 18, 81 due to variation or stack-up in manufacturing tolerances, and the like, will be less likely to cause any wear, operational or noise problems. Because the input shaft 18 and the output shaft 81 are not piloted on one another, or directly connected, thrust loads are not transferred between these shafts 18, 81 and accordingly each self-contained shaft unit is only concerned with the elements mounted thereon and the loads resulting therefrom. As fewer elements are mounted on each of the shafts 18, 81, than in former transmissions of this general type, there is less stack-up of manufacturing tolerances and thus the overall variation or permissible limits of variation are kept to a minimum. Because of the use of separated, self-contained, input and output shaft assemblies, fewer thrust washers are required because there are no thrust loads transferred between the shafts 18, 81 nor between the gearing 50, 60 and the gear box housing 42.

It will be noted that the gearing 50, 60 is anchored to the output shaft 81 by the snap ring 67 and the spline connection 87. This arrangement prevents transfer of gearing thrust loads to the casing 42 and also tends to maintain the gearing elements in alignment so that less wear, noise and operational problems can develop.

While the self-contained arrangement of the gearing 50, 60 on the output shaft 81 is a considerable advantage, this transmission design also includes certain lubrication features that materially improve the life and operational characteristics of the clutch assemblies $C_1$, $C_2$ that are mounted on the input shaft 18. The converter reaction shaft support plate 20 (see FIGS. 2 and 5–7) serves as a lubrication gallery for the fluid that is circulated through the converter A and through the gear box B. This fluid is used both for lubrication and transmission control purposes. In addition support plate 20 has the hollow reaction sleeve 19 splined thereto at 70 so that a means is provided to take the reaction of the stator or guide wheel 17 of the converter A. With regard to the use of plate 20 as a fluid gallery, it will be noted from FIG. 5 that plate 20 includes a bore 91 that serves as a supply or "in" conduit for fluid passed to the converter unit A. Plate 20 also includes a bore 92, that has a branch 92a, that serves as a discharge or "out" conduit for fluid passed through the converter unit A. Plate 20 also includes bores 93 and 94 that are fluid feed passages for the clutches $C_1$ and $C_2$ respectively. Plate 20 also includes passages 95 and 96 that are respectively the "in" or feed passage and the "out" or discharge passage for the front pump 25. Fluid from the sump 26' (see FIG. 2) passes through the passage 27' to the "in" passage 95 in plate 20 for delivery to the suction side of pump 25. Pressurized fluid is delivered by pump 25 to the discharge passage 96 which conducts the pressurized fluid to the transmission control mechanism 99. Pressurized fluid supplied to the control mechanism 99 is dispensed to the several control passages 91–94 in accordance with the requirements of the transmission. In FIGS. 2 and 4 certain of the fluid passages of plate 20 have been displaced from their actual positions shown in FIG. 5 so that they would be more readily visible. It is to be understood that FIG. 5 represents the actual arrangement of the several fluid passages on plate 20 whereas FIGS. 2 and 4 show certain of these passages of plate 20 in more or less diagrammatic form for the sake of clarity.

One of the features of this transmission that is quite beneficial and lends itself to the simplification of the transmission lubrication system is the use of converter "in" pressurized fluid for the lubrication of the forwardly located clutch $C_2$. Looking at FIGS. 4 and 6 particularly it will be noted that the cooled, pressurized, fluid passed through the converter "in" passage 91 has a small portion thereof bled off by a restrictive orifice 91a and discharged into a bore 97 in the sleeve-like hub 32 of the plate 20. From the rear end of bleed bore 97 the pressurized lube fluid can drain out onto the clutch plates 41, 48 of the clutch $C_2$ prior to settling in the reservoir sump 26'. The major portion of the converter "in" fluid from supply conduit 91 is passed into the branch conduit 91b from whence it is directed into the annular space 98 between shafts 13b and 19 (see FIG. 2). Fluid in space 98 passes into the converter housing 13 for circulation therein by the rotor wheels 14, 15, 17. From the foregoing description it is thought that it is clear that converter supply or "in" fluid has a small portion thereof bled off and discharged through a bore 97 in the plate hub 32 to a location where it can continuously lubricate the forwardly located direct and reverse drive clutch $C_2$.

In addition to supplying clutch $C_2$ with lubricating fluid bled off from the converter "in" supply conduit 91, this invention inludes an improved means for lubricating the bearing 104 for the forwardly located direct drive clutch $C_2$. From FIGS. 2, 4 and 7 it will be noted that lube fluid supplied to the interior of the converter casing 13 is discharged from the casing 13 by way of the annular space 102 between shafts 18 and 19. Discharge passage 102 connects with the converter "out" passage 92 that directs the fluid to an oil cooler (not shown) prior to discharging the converter "out" fluid into the sump 26'. Part of the lube fluid from converter discharge passage 102 is directed into the branch conduit 92a from where it is transferred by cross bore 101 to the axially extending sleeve bearing 104 between the plate hub portion 32 and the brake drum inner support collar 43f. Thus the converter "out" fluid provides a part of the fluid for lubricating the clutch $C_2$. After the lubricating fluid from cross bore 101 has passed across the sleeve bearing 104 it can drain downwardly across the clutch plates 41, 48 of the clutch $C_2$ to assist in lubrication of these friction plates 41, 48. It will be seen that there are two sources of lubrication for the clutch plates 41, 48 of the direct drive clutch $C_2$, namely the primary source from the converter "in" fluid and the secondary source from the drain-off of the converter "out" fluid supplied to lubricate the clutch drum bearing 104.

Lubrication of the clutch plates 28, 31 of forward drive clutch $C_1$ is supplied by lube fluid bled off from the lube oil bore 107 that extends axially of the output shaft 81. The bore 107 supplies lube oil to a number of the elements of the gear trains 50, 60 and in addition provides lube fluid for clutch $C_1$. It will be noted that the forward end of lube bore 107 is plugged by a cup 108 that has one or more perforations 109 therein through which lube oil supplied to bore 107 may bleed out to drain down onto the clutch plates 28, 31 of clutch $C_1$. This type of lube oil feed to the clutch plates 28, 31 is facilitated by the fact that the shafts 18, 81 are not piloted in one another and the forward end of shaft 81 is substantially in transverse alignment with the clutch plates 28, 31.

It is thought to be quite clear that the output shaft bore 107 has branch or cross bores 110, 111 and 112 that lubricate respectively the hub portion 64b of the annulus gear 64, the bearings 86 for the sun gear sleeve 85, and the pinion gearing 52 of gear train 50. Feed to the lube bore 107 is by way of the cross bore 114 that is connected to the output of pumps 25 and/or 84. Collar 42c also includes a lube bore 117 for the hub of carrier 53.

It will be noted that the end walls 20 and 42d of the housing 42 each have axially aligned, opposed, sleeve-like, collars 32 and 42c respectively that provide elongated journal bearings for the input and output shafts 18, 81. Each of these journal bearings 32 and 42c also includes lubrication bores that improve transmission life.

We claim:
1. A variable speed transmission for an automotive vehicle comprising a housing, axially aligned, input and output shafts journaled in sleeve-like, axially extending, inwardly disposed, bearing portions at opposite ends of said housing, a pair of friction clutch devices mounted on and extending concentrically about one of said shafts, a pair of planetary gear train devices mounted on and spaced axially along the other of said shafts, each of said shafts and the devices mounted thereon comprising self-contained units wherein the axially directed thrust forces applied to one shaft are isolated from the other shaft, each of said gear trains comprising a sun gear, an annulus gear and a pinion gear carrier having pinion gearing rotatably mounted thereon and meshingly engaged with the associated sun and annulus gears, drive transmitting means connecting one of said clutch devices to one gear of each of said gear trains, drive transmitting means connecting the other of said clutch devices to another gear of one gear train, means drivingly connecting the remaining gear of said one gear train to said other shaft, means preventing the transmission of gearing thrust forces from said other shaft to said one shaft, means drivingly connecting another one of the gears of the other gear train to said other shaft, means anchoring the gear sets to said other shaft and preventing the transmission of gearing thrust forces to said housing, and brake means to activate said gear trains for the transmission of a plurality of different speed ratio drives between said shafts.

2. A variable speed transmission for an automotive vehicle comprising a housing, axially aligned, separated, input and output shafts journaled in sleeve-like, axially extending, inwardly disposed, bearing elements at opposite ends of said housing, a pair of friction clutch devices mounted on and extending concentrically about one of said shafts, a pair of planetary gear train devices mounted on and spaced axially along the other of said shafts, each of said shafts and the devices mounted thereon comprising self-contained units wherein the axially directed thrust forces applied to one shaft are isolated from the other shaft, each of said gear trains comprising a sun gear, an annulus gear and a pinion gear carrier having pinion gearing rotatably mounted thereon and meshingly engaged with the associated sun and annulus gears, means drivingly connecting the sun gears of the pair of gear trains, drive transmitting means connecting one of said clutch devices to said sun gears, drive transmitting means connecting the other of said clutch devices to the annulus gear of one gear train, means drivingly connecting the pinion gear carrier of said one gear train to said other shaft and preventing the transmission of gearing thrust forces to said one shaft, means drivingly connecting the annulus gear of the other gear train to said other shaft and preventing the transmission of gearing thrust forces to said housing, brake means to anchor said sun gears against rotation, and brake means to anchor the pinion gear carrier of the other gear train against rotation.

3. A variable speed transmission for an automotive vehicle comprising a housing having axially aligned, inwardly disposed, sleeve-like collars at opposite ends thereof, axially aligned, separated, input and output shafts journaled in said housing collars, a pair of friction clutch devices mounted on and extending concentrically about one of said shafts, a pair of planetary gear train devices mounted on and spaced axially along the other of said shafts, each of said shafts and the devices mounted thereon comprising self-contained units wherein the axially directed thrust forces applied to one shaft are isolated from the other shaft, each of said gear trains comprising a sun gear, an annulus gear and a pinion gear carrier having pinion gearing rotatably mounted thereon and meshingly engaged with the associated sun and annulus gears, means drivingly connecting the sun gears of the pair of gear trains, drive transmitting means connecting one of said clutch devices to said sun gears, drive transmitting means connecting the other of said clutch devices to the annulus gear of one gear train, means drivingly connecting the pinion gear carrier of said one gear train to said other shaft and preventing the transmission of gearing thrust forces to said one shaft, means drivingly connecting the annulus gear of the other gear train to said other shaft and preventing the transmission of gearing thrust forces to said housing, brake means to anchor said sun gears against rotation, brake means to anchor the pinion gear carrier of the other gear train against rotation, and a lubrication bore in the sleeve-like collar at the end of the housing that journals said one shaft providing means for lubricating one of said clutches and a lubrication bore in the other of said shafts providing lubrication means for the other of said clutches and said gear trains mounted on said other shaft.

4. A variable speed transmission for an automotive vehicle comprising a housing having axially aligned, inwardly disposed, sleeve-like collars at opposite ends, axially aligned, input and output shafts journaled in said housing collars, a pair of friction clutch devices mounted on and extending concentrically about one of said shafts, a pair of planetary gear train devices mounted on and spaced axially along the other of said shafts, each of said shafts and the devices mounted thereon comprising self-contained units wherein the axially directed thrust forces applied to one shaft are isolated from the other shaft, drive transmitting means connecting one of said clutch devices to said gear trains, drive transmitting means connecting the other of said clutch devices to one gear train, means drivingly connecting the gear trains to said other shaft and preventing the transmission of gearing thrust forces therefrom to said one shaft and to said housing, brake means to activate said gear trains for the transmission of a plurality of speed ratio drives, lubrication conduit means in one of said collars to conduct lube fluid to one of said clutch devices and the journal for said one shaft lubrication conduit means in the other of said shafts to conduct lube fluid to the other of said clutches, and lubrication conduit means in the other of said collars to conduct lube fluid to at least one of said gear trains.

5. A variable speed transmission for an automotive vehicle comprising a housing, axially aligned, input and output shafts journaled in sleeve-like, axially extending, inwardly disposed bearing portions at opposite ends of said housing, a pair of friction clutch devices mounted on and extending about said input shaft, a pair of planetary gear train devices mounted on and spaced axially along said output shaft, each of said shafts and the devices mounted thereon comprising self-contained units wherein the axially directed thrust forces applied to one shaft are isolated from the other shaft, each of said gear trains comprising a sun gear, an annulus gear and a pinion gear carrier having pinion gearing rotatably mounted thereon and meshingly engaged with the associated sun and annulus gears, drive transmitting means connecting one of said clutch devices to one gear of each of said gear trains, drive transmitting means connecting the other of said clutch devices to another gear of one gear train, means drivingly connecting the remaining gear of said one gear train to said output shaft, means preventing the transmission of gearing thrust forces from said output shaft to said input shaft, means drivingly connecting another one of the gears of the other gear train to said output shaft, means preventing the transmission of gearing thrust forces to said housing, and brake means to activate said gear trains for the transmission of a plurality of different speed ratio drives between said shafts.

6. A variable speed transmission for an automotive vehicle comprising a housing having axially aligned, inwardly disposed, sleeve-like collars at opposite ends, axially aligned, input and output shafts journaled in said housing collars, a pair of friction clutch devices mounted on and extending about said input shaft, a pair of planetary gear train devices mounted on and spaced axially along the other of said shafts, each of said shafts and the devices mounted thereon comprising self-contained units wherein the axially directed gearing generated thrust forces applied to said output shaft are isolated from the input shaft, drive transmitting means connecting one of said clutch devices to said gear trains, drive transmitting means connecting the other of said clutch devices to one gear train, means drivingly connecting the gear trains to said output shaft and preventing the transmission of gearing thrust forces therefrom to said input shaft and to said housing, brake means to activate said gear trains for the transmission of a plurality of speed ratio drives, lubrication means in the one of said collars journalling said input shaft to conduct lube fluid to one of said clutch devices and lubrication means in one of said shafts to conduct lube fluid to the other of said clutches, and lubrication means in the other of said collars journalling said output shaft to conduct lube fluid to at least one of said gear trains.

References Cited in the file of this patent
UNITED STATES PATENTS

| | | |
|---|---|---|
| 2,416,129 | Swift | Feb. 18, 1947 |
| 2,608,272 | Rich | Aug. 26, 1952 |

(Other references on following page)

UNITED STATES PATENTS

| | | |
|---|---|---|
| 2,645,137 | Roche | July 14, 1953 |
| 2,693,248 | Gaubatz et al. | Nov. 2, 1954 |
| 2,720,124 | Polomski | Oct. 11, 1955 |
| 2,722,133 | Lapsley | Nov. 1, 1955 |
| 2,722,141 | Swift | Nov. 1, 1955 |
| 2,736,412 | Livezey | Feb. 28, 1956 |
| 2,749,777 | Simpson | June 12, 1956 |
| 2,757,552 | English | Aug. 7, 1956 |
| 2,821,095 | Kelley | Jan. 28, 1958 |
| 2,856,794 | Simpson | Oct. 21, 1958 |
| 2,866,361 | Gatiss | Dec. 30, 1958 |
| 2,876,656 | Herndon | Mar. 10, 1959 |
| 2,907,232 | Duffy | Oct. 6, 1959 |
| 2,950,630 | Zeidler | Aug. 30, 1960 |